US011059695B2

(12) United States Patent
Zahnd et al.

(10) Patent No.: US 11,059,695 B2
(45) Date of Patent: Jul. 13, 2021

(54) CABLE REEL

(71) Applicant: iPEK International GmbH, Sulzberg (DE)

(72) Inventors: Fabian Zahnd, Waltenhofen (DE); Simon Grimm, Kempten (DE); Gerhard Kennerknecht, Oberstdorf-Tiefenbach (DE); Michael Kress, Kempten (DE)

(73) Assignee: iPEK International GmbH, Sulzberg (DE)

( * ) Notice: Subject to any disclaimer, the term of this patent is extended or adjusted under 35 U.S.C. 154(b) by 131 days.

(21) Appl. No.: 16/575,772

(22) Filed: Sep. 19, 2019

(65) Prior Publication Data
US 2020/0095089 A1    Mar. 26, 2020

(30) Foreign Application Priority Data

Sep. 19, 2018 (EP) ..................................... 18195574

(51) Int. Cl.
| B65H 75/44 | (2006.01) |
| B65H 57/14 | (2006.01) |
| G01M 3/00 | (2006.01) |

(52) U.S. Cl.
CPC ......... *B65H 75/4484* (2013.01); *B65H 57/14* (2013.01); *G01M 3/005* (2013.01)

(58) Field of Classification Search
CPC ............ B65H 75/4484; B65H 75/4449; B65H 75/38; B65H 75/4402; B65H 57/14; G01M 3/005
See application file for complete search history.

(56) References Cited

U.S. PATENT DOCUMENTS

| 1,527,478 | A | | 2/1925 | Harper |
| 3,025,009 | A | | 3/1962 | Aschinger |
| 3,061,234 | A | * | 10/1962 | Morey ............... B65H 75/4434 |
| | | | | 242/378.2 |

(Continued)

FOREIGN PATENT DOCUMENTS

| DE | 19743215 C1 | 5/1999 |
| EP | 0623544 A2 | 4/1994 |

(Continued)

OTHER PUBLICATIONS

Research report issued by the German Patent Office for corresponding German Patent Application No. 20 2018 105 386.8, dated Jul. 20, 2020, with English translation attached.

*Primary Examiner* — Michael E Gallion
(74) *Attorney, Agent, or Firm* — Myers Wolin, LLC (57) ABSTRACT

A cable reel is provided, in particular for a pipe inspection system, the cable reel having a frame and a cable receptacle. The cable receptacle is rotatably arranged on the frame, it being possible to wind a cable onto the cable receptacle and unwind it from the cable receptacle. The cable receptacle has an inner cage and an outer cage, with the diameter of the inner cage being smaller than the diameter of the outer cage. The inner cage is arranged coaxially with respect to the outer cage and is inside the outer cage. It is possible to rotate the inner cage and the outer cage independently of one another, and the inner cage is receives a first cable portion of the cable and the outer cage receives a second cable portion of the cable.

17 Claims, 4 Drawing Sheets

(56) References Cited

U.S. PATENT DOCUMENTS

| | | | | |
|---|---|---|---|---|
| 3,144,218 A * | 8/1964 | Tepe | | B65H 75/4449 |
| | | | | 242/378.2 |
| 3,360,242 A | 12/1967 | Lawrence | | |
| 3,539,123 A * | 11/1970 | Shutt | | B65H 75/4449 |
| | | | | 242/386 |
| 3,576,295 A | 4/1971 | Hale | | |
| 3,773,987 A * | 11/1973 | Davis | | B65H 75/4431 |
| | | | | 191/12.4 |
| 3,822,834 A * | 7/1974 | Fjarlie | | H02G 11/02 |
| | | | | 242/388.5 |
| 4,010,913 A * | 3/1977 | Guerster | | B65H 75/38 |
| | | | | 242/378.1 |
| 4,436,190 A * | 3/1984 | Wentzell | | B65H 75/4449 |
| | | | | 191/12.2 R |
| 4,989,805 A * | 2/1991 | Burke | | B65H 75/44 |
| | | | | 242/378.2 |
| 5,284,323 A * | 2/1994 | Pawkett | | B63B 21/66 |
| | | | | 254/134.3 SC |
| 5,332,171 A * | 7/1994 | Steff | | B65H 75/38 |
| | | | | 242/378 |
| 7,229,042 B2 * | 6/2007 | Thebault | | G02B 6/4457 |
| | | | | 242/388.1 |
| 9,099,851 B2 * | 8/2015 | Berg | | H02G 11/00 |
| 9,327,938 B2 * | 5/2016 | Wilson | | H02G 11/02 |
| 10,287,147 B1 * | 5/2019 | Baugh | | B66D 1/38 |
| 2013/0284843 A1 * | 10/2013 | Mertesdorf | | G02B 6/4458 |
| | | | | 242/397 |
| 2014/0262663 A1 * | 9/2014 | Draganovic | | B65H 75/4484 |
| | | | | 191/12.2 A |

FOREIGN PATENT DOCUMENTS

| | | |
|---|---|---|
| FR | 2 385 632 | 10/1978 |
| JP | 64-43469 S | 2/1989 |
| WO | 96/36552 | 11/1996 |

* cited by examiner

CABLE REEL

CROSS REFERENCE TO RELATED APPLICATIONS

The present application claims priority of European Application No. 18 195 574.1, filed Sep. 19, 2018, the contents of which are incorporated herein by reference.

FIELD OF THE INVENTION

The invention relates to a cable reel, in particular for a pipe inspection system, the cable reel having a frame and a cable receptacle, the cable receptacle being rotatably arranged on the frame, and it being possible to wind a cable onto the cable receptacle and unwind it from the cable receptacle.

BACKGROUND OF THE INVENTION

Such cable reels for pipe inspection systems are known. They are used to wind and unwind cables, such as power cables. Using the power cable, it is possible to supply electrical energy to, for example, a carriage that is moved within a duct. The cable can also be used for data transmission to and from the carriage. The cable is pulled into the duct by the carriage.

A so-called push rod having a certain length can be arranged at the front end of the cable instead of a carriage. The push rod has a certain rigidity. For example, an image recording device (camera) can be arranged at the free end of the push rod. Because of the rigidity of the push rod, it can be pushed into a pipe or into a duct. The push rod can also be placed into the duct with a carriage, it being possible for the carriage to be adapted to feed the push rod into the duct. Regardless of how the push rod is placed in the duct, the push rod pulls the cable attached to the rear end along behind it. The push rod itself also has power and/or signal lines coupled to the power/signal lines of the cable. The push rod is substantially nothing more than a specially designed cable with a predetermined rigidity.

Both the cable and push rod can be wound onto a single cable reel or unwound from it again. Because of the rigidity of the push rod, winding onto the cable reel is extremely inconvenient. This is because, due to its rigidity, the push rod attempts to take on its original orientation while being wound onto the cable reel, i.e., it attempts to return from a curved orientation to a largely straight orientation. This can lead to crossovers of the wound push rod.

Likewise, care should be taken when winding the cable to ensure that the cable does not cross over.

OBJECT OF THE INVENTION

The object of the present invention is therefore to provide a cable reel with which a cable and a push rod arranged thereon can easily and safely be wound onto a cable reel and unwound from it again, without this resulting in crossovers of the cable and/or the push rod.

Solution According to the Invention

According to the invention, this object is achieved with a cable reel according to the independent claim. Advantageous embodiments of the invention are specified in the dependent claims.

Accordingly, provision is made of a cable reel, in particular for a pipe inspection system, the cable reel having a frame and a cable receptacle, the cable receptacle being rotatably arranged on the frame, it being possible to wind a cable onto the cable receptacle and unwind it from the cable receptacle, and the cable receptacle having an inner cage and an outer cage, the diameter of the inner cage being smaller than the diameter of the outer cage, the inner cage being arranged coaxially with respect to the outer cage and being inside the outer cage, it being possible to rotate the inner cage and the outer cage independently of one another, and the inner cage being provided for receiving a first cable portion of the cable and the outer cage being provided for receiving a second cable portion of the cable.

A feeding device can be arranged on the frame, which feeding device is adapted to supply the cable to the cable receptacle in a defined manner for winding, and/or to unwind the cable from the cable receptacle in a defined manner.

The feeding device can be arranged radially outside the outer cage. Optionally, the feeding device can also be arranged laterally on the outer cage.

The feeding device can have at least one first drive unit with which the cable is fed in a defined manner and/or unwound in a defined manner.

The inner cage can be coupled to a second drive unit to rotate the inner cage about an axis of rotation.

The outer cage can be freely rotatable about the axis of rotation.

A guide means, through which the first cable portion can be guided to the inner cage or vice versa, can be provided on the outer cage.

The guide means can be arranged on the outer cage such that the first cable portion can be guided from radially outside the outer cage to the inner cage or vice versa.

The guide means can have two rollers that are spaced apart from each other and extend parallel to the axis of rotation, the first cable portion extending between the two rollers.

It is advantageous if the diameter of the cable of the first cable portion is smaller than the diameter of the cable of the second cable portion, and/or the first cable portion is coupled to the second cable portion via a coupling element, the spacing between the two rollers (31, 32) being chosen such that it is greater than the diameter of the cable of the first cable portion and it is smaller than the diameter of the cable of the second cable portion and/or smaller than the diameter of the coupling element.

The guide means can form a catch means together with the coupling element and/or together with the transition region from the first cable portion to the second cable portion such that, during winding of the cable, the first cable portion completely wound on the inner cage carries along the outer cage such that the second cable portion is wound onto the outer cage.

The feeding device can be movable, preferably movable in an alternating reciprocal manner, along a guide means, the guide means preferably being at least as long as the width of the cable receptacle.

The guide means can comprise a guide rail that preferably extends parallel to the axis of rotation.

The feeding device can have a third drive unit with which the feeding device is moved.

The travel speed of the feeding device can depend on the diameter of the cable.

The feeding device can be adapted to put tension on or maintain the tension of the cable between the feeder and the cable receiver during winding onto the cable receptacle.

The cable reel can have a sensor device that is adapted to detect the transition region from the first cable portion to the second cable portion and/or the coupling element during the winding and/or during the unwinding of the cable, the feeding device being adapted to change the travel speed upon detection of the transition region and/or the coupling element.

The at least one first drive unit and the second drive unit can be coordinated with one another such that
the at least one first drive unit prescribes or defines the winding speed and/or the unwinding speed, and
the second drive unit ensures that the cable is tensioned between the feeding device and the cable receptacle.

The cable reel can have a number of transverse struts that are spaced apart from one another and extend substantially parallel to the axis of rotation, the transverse struts
being arranged radially outside the outer cage and in the circumferential direction with respect to the outer cage and being attached to the frame, or
being arranged in the circumferential direction on the outer cage and being attached to the outer cage.

The first cable portion can be a conventional cable, such as a cable with power and signal lines. The second cable portion can be a push rod that also has power and/or signal lines. The push rod (second cable portion) is significantly more rigid compared to the cable (first cable portion).

Alternatively, the second cable portion can also be a conventional cable that has, however, a larger diameter compared to the first cable portion.

Both the first cable portion and the second cable portion are adapted to be used with a pipe and/or duct inspection system.

By providing an inner and an outer cage, it is possible to ensure that the first cable portion is wound onto a different cage than the second cable portion. This ensures that the second cable portion is wound side by side during winding. This cannot be guaranteed in every case when the second cable portion is wound on the inner cage since the second cable portion can come to rest directly next to the first cable portion during winding. However, because the second cable portion has a larger diameter than the first cable portion, a step would arise between the end of the first cable portion and the beginning of the second cable portion, which can adversely affect the further winding process.

If a second cable portion with a higher level of rigidity were also wound onto the inner cage, the layers would initially lie on top of each other normally with sufficient tension. However, if the winding process is ended or the cable is unwound or the drive of the cable receptacle is switched off, the tension acting on the cable cannot be maintained permanently or can be maintained only with considerable additional technical effort. The slackening of the tension causes the inner wound layers of the second cable portion, which are subject to high tension due to the high rigidity of the second cable portion, to push outwardly and push past the outer layers. During unwinding, the layers of the second cable portion, which are actually supposed to be unwound first, are suddenly under the formerly inner layers. This behavior is called overlap and often has the result that the cable can no longer be unwound or can be unwound only with considerable effort due to the layers that are "tangled" multiple times. Opening the cable reel or tediously winding and unwinding manually is often necessary to solve these overlaps again.

By providing a feeding device, with which the cable can be fed to the cable receptacle for winding in a defined manner and/or with which the cable can be unwound from the cable receptacle, such overlaps are avoided.

BRIEF DESCRIPTION OF THE DRAWINGS

Further details and features of the invention and specific, in particular advantageous, embodiments of the invention will become apparent from the following description in conjunction with the drawings. In the drawings.

DETAILED DESCRIPTION OF THE INVENTION

Figure 1:
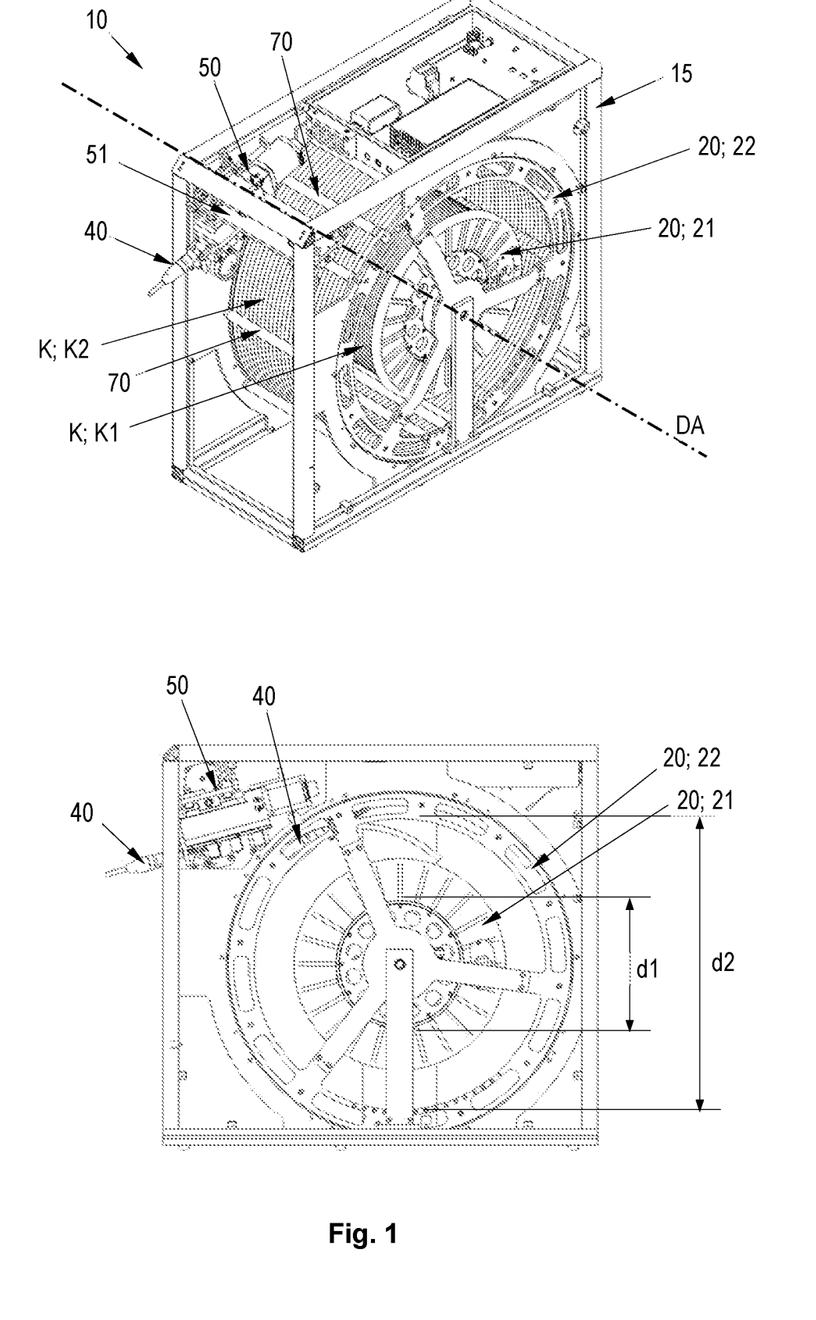
FIG. 1 shows a cable reel according to the invention in a perspective view and in a side view.

FIG. 1 shows a cable reel 10 according to the invention in a perspective view (top) and in a side view (bottom).

Cable reel 10 has a frame 15 that is substantially designed as a cuboid frame here. A cable receptacle 20, onto which cable K is wound and from which cable K is unwound, is arranged on the frame 15.

The cable receptacle 20 comprises two cages, namely an inner cage 21 and an outer cage 22, the inner cage 21 being arranged coaxially with respect to the outer cage 22 and being inside the outer cage 22. Both cages 21, 22 can be rotated about axis of rotation DA. The inner cage 21 has a diameter d1. The outer cage has a diameter d2.

The outer cage 22 can, in this case, be rotated independently of the inner cage 21. That is, the inner cage 21 can be rotated while the outer cage 22 is stationary, or vice versa. Both cages 21, 22 can also be rotated simultaneously.

According to the invention, the inner cage 21 is associated with a drive means not shown here, for example an electric motor, with which the inner cage 21 can be rotated about axis of rotation DA. The outer cage 22, however, does not have its own drive means, i.e., the outer cage can be rotated freely about axis of rotation DA independently of the inner cage 21.

The cable K to be wound comprises two cable portions K1, K2.

According to the embodiment shown in FIG. 1, the first cable portion K1 is connected to the second cable portion K2 via a coupling element 40. The coupling element 40 has a larger diameter than the first cable portion K1. In the lower drawing of FIG. 1, the coupling element 40 is shown twice, once outside frame 15, i.e., before it is wound onto the outer cage 22, and once already wound on the outer cage 22.

Alternatively, the first cable portion K1 can also be connected to the second cable portion K2 without a coupling element 40. In this case, the invention provides that the diameter of the second cable portion K2 be greater than the diameter of the first cable portion K1.

The invention provides that the first cable portion K1 be wound on the inner cage 21, whereas the second cable portion K2 be wound on the outer cage 22. The difference between the two cage diameters d1, d2 is to be chosen such that the entire first cable portion K1 can be completely wound on the inner cage 21.

A feeding device 50, with which cable K can be wound onto cable receptacle 20 in a defined manner or unwound from cable receptacle 20 in a defined manner, is arranged on frame 15. Here, "in a defined manner" means that cable K is fed to the cable receptacle 20 for winding from the feeding device 50 at a certain speed or is unwound from the cable receptacle 20 by the feeding device 50 at a certain speed.

For the defined winding or unwinding, the feeding device 50 has feed means, not shown here, with which the cable is fed for winding and unwinding.

In one embodiment, the feed means can have two or a plurality of rollers that rest on the cable sheath with a predetermined force. The cable is advanced by rotating the rollers. The rollers can be driven by an electric motor.

In an alternative embodiment, the feed means can comprise clamping jaws between which the cable is clamped. The clamping jaws can be opened and closed. The clamping jaws move back and forth and carry the cable along in the feed direction in the closed state. After the feeding process, the clamping jaws open and move opposite the feed direction to an end position where they are closed again.

It is advantageous in this case if two pairs of clamping jaws are provided that move in an alternating reciprocal manner. In each case, one pair of clamping jaws is closed. The respectively closed pair of clamping jaws moves in the feed direction and thus causes the cable to be fed while the respective other pair of clamping jaws is open and moves against the feed direction. This ensures that the cable is being held by one of the two pairs of clamping jaws at all times.

The movement of the clamping jaws in or against the feed direction can be accomplished by means of an electric motor.

In a further alternative embodiment, the feed means can also have toothed belts or chains that rest on the cable sheath with a predetermined force on both sides. The toothed belts or chains can be driven by an electric motor.

Other feed means can also be provided. All that is important here is that a defined feeding (during winding and/or unwinding) of the cable be possible using said feed means.

The feeding device 50 is arranged on a guide means 51. The guide means 51 can be designed as a guide rail 51 that substantially extends parallel to axis of rotation DA and is arranged radially outside the outer cage 22 on the frame 15. The feeding device 50 can be moved back and forth along guide means 51 or along guide rail 51. To move the feeding device 50 along guide rail 51, the feeding device 50 has an electric motor not shown here. The guide means 51 or the guide rail 51 is preferably at least as long as the cable receptacle 20 is wide.

Figure 4:
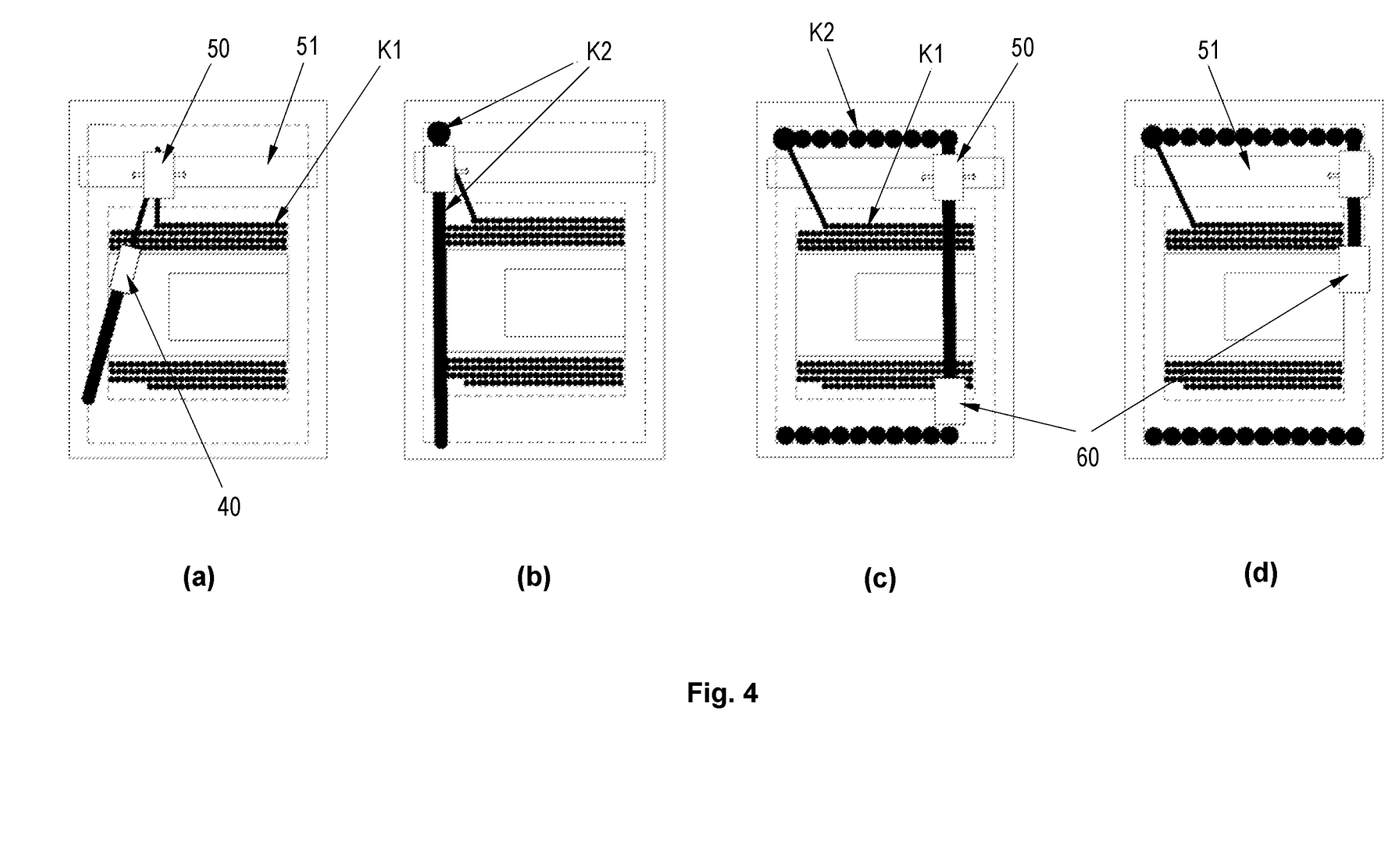
FIG. 4 shows schematic views (drawings (a) to (d)) of a cable reel according to the invention to illustrate a winding process.

The movement of the feeding device 50 ensures that the cable K to be wound up is correctly wound on the respective cage, i.e., that each winding of the cable is directly next to the preceding winding, as can be seen, for example, in FIG. 4. Here, the feeding device 50 is moved in such a way that its position on guide rail 51 corresponds to the current winding position of the cable on the respective cage. This means that the feeding device 50 is moved continuously and at a predetermined speed along the guide rail 51 during a winding process.

The speed at which the feeding device 50 is moved along the guide rail 51 depends, on the one hand, on the speed (winding speed) at which the cable is wound up or unwound and, on the other hand, on the diameter of the cable portion being wound up or unwound. If the winding speed remains the same, the travel speed of the feeding device 50 increases when the diameter of the cable portion to be wound is increased. When the winding speed is increased and the diameter of the cable portion to be wound remains the same, the travel speed also increases.

The winding speed is defined or prescribed by the feed means of the feeding device 50. If, for example, two or more rollers are used as feed means, the winding speed (=speed at which the cable is fed to the rollers or at which the cable is unwound from the rollers) can be derived from the rotational speed of the rollers or from the rotational speed of the electric motor with which the rollers are driven. A controller can then determine the required travel speed of the feeding device on the basis of the winding speed and on the basis of the cable diameter (which can be detected by means of sensors arranged on the feeding device 50) and correspondingly control the electric motor provided for moving the feeding device. Instead of determining the cable diameter with corresponding sensors, the cable diameters for the two cable portions K1, K2 can also be stored in a memory device of the controller.

The feeding device 50 can also have a sensor device with which the transition from one cable portion to the other cable portion can be detected.

This transition can be detected by detecting a change in the cable diameter, the cable diameters themselves not needing to be detected for this purpose if the cable diameters are stored in the memory device. On the basis of the current feed direction, the controller knows which cable portion it is currently feeding after a detection of a change in the cable diameter.

If, however, a coupling element 40 is provided between the two cable portions, this sensor device can detect a passing of the coupling element.

Without providing a coupling element, the invention provides that the diameter of the second cable portion K2 be greater than the diameter of the first cable portion K1.

If, on the other hand, such a coupling element 40 is provided, the diameters of the first and of the second cable portion can be identical thus, the travel speed of feeding device 50 would be identical for both cable portions at a constant winding speed. It is only important that the diameter of the coupling element be greater than the diameter of the first cable portion K1.

If the cable K to be wound up is so long that a plurality of layers have to be wound on the respective cage 21, 22, the feeding device 50 changes its direction of travel at predetermined end positions. These end positions can be different for the inner cage 21 and for the outer cage 22, for example if the inner cage 21 has a smaller width than the outer cage 22, as can be seen, for example, in FIG. 4.

With the drive means, for example an electric motor, of the inner cage 21, the inner cage 21 is rotated such that the first cable portion K1 supplied from the feeding device 50 is wound onto the inner cage 21. However, the winding speed is not influenced by the drive of the inner cage 21 it is determined solely by the feeding device 50, as described above. However, the drive means of the inner cage 21 is designed in such a way that the first cable portion K1 to be wound onto the inner cage 21 is always under tension or pretensioned between the inner cage 21 and the feeding device 50. The drive means of the inner cage 21 ultimately becomes similar to an infinite spring.

As soon as the coupling element 40 is fed to the cable receptacle 20 (when cable K is being wound up), the coupling element, together with a guide means 30 (see FIGS. 2 and 3), causes the outer cage 22 to rotate as well, and the coupling element and the second cable portion K2 following the coupling element are wound onto the outer cage 22. Here, the coupling element 40 and the guide means 30 act as a kind of catch that carries along the outer cage 22 when the inner cage 21 is rotated. This principle will be described in more detail with reference to FIG. 2 and FIG. 3.

Figure 2:
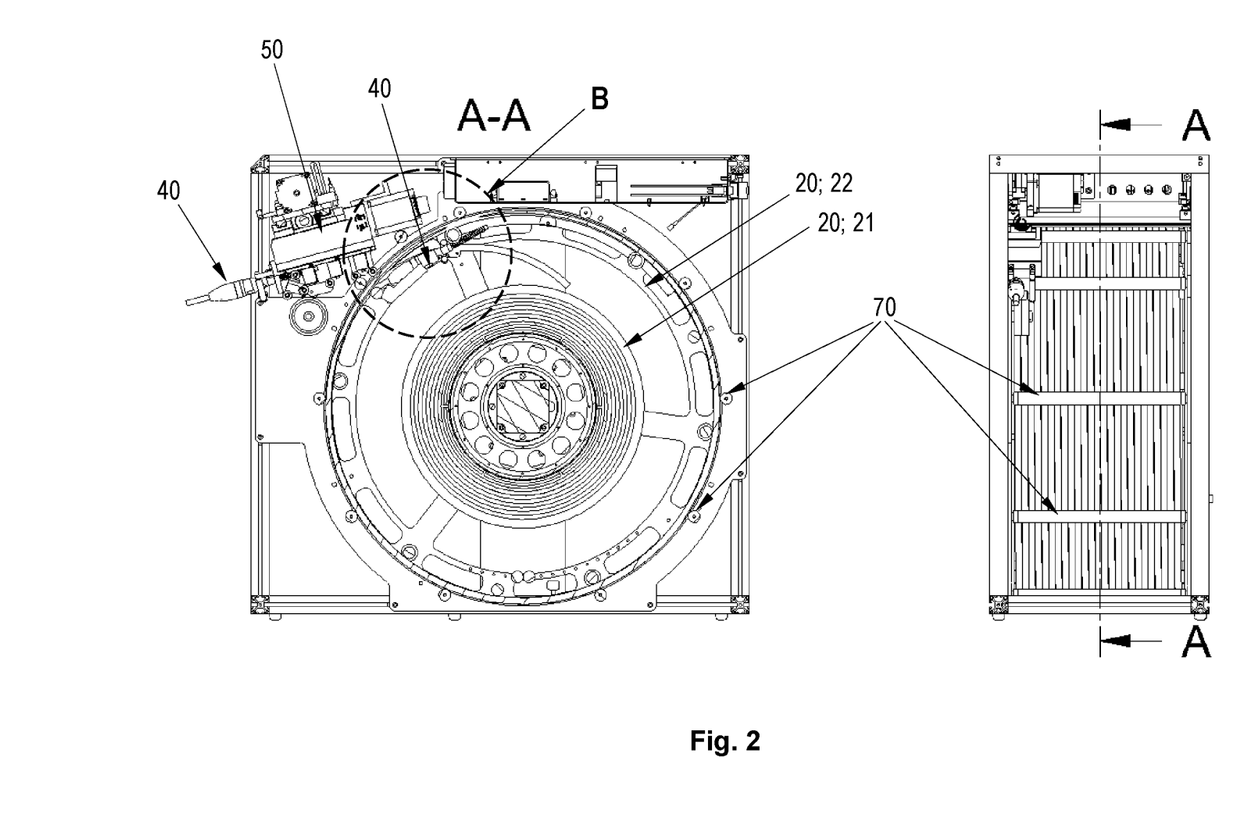
FIG. 2 shows a cable reel according to the invention in a sectional view along sectional axis A-A.
Figure 3:
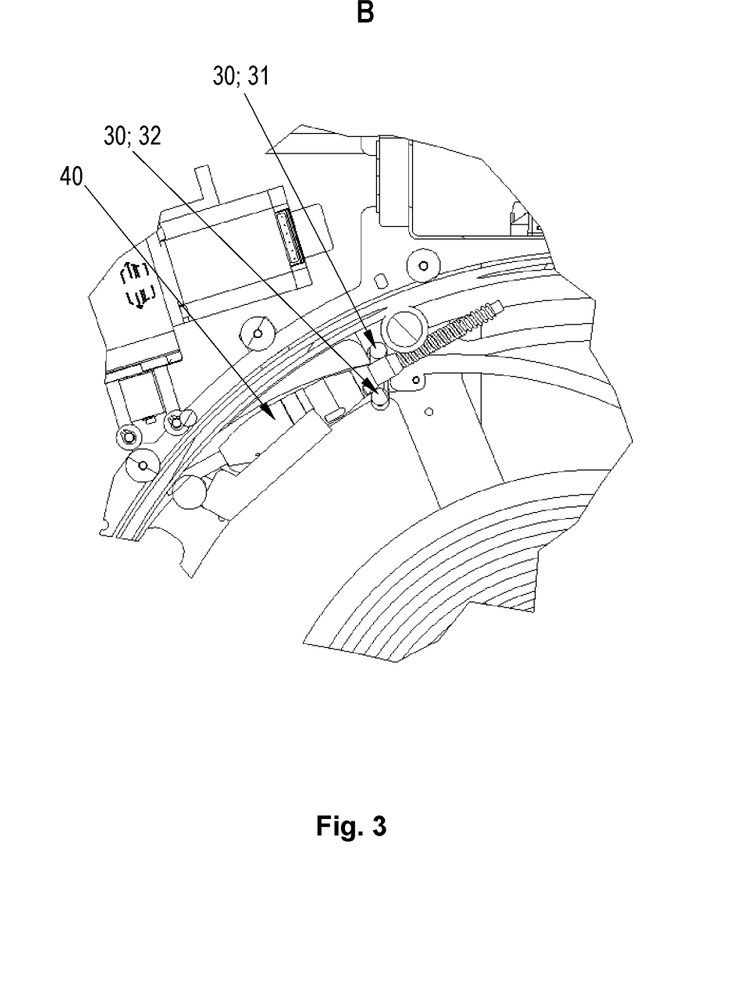
FIG. 3 shows a section B of FIG. 2 in an enlarged view.

The same applies if no coupling element is provided between the two cable portions K1, K2, and the diameter of the first cable portion K1 is smaller than the diameter of the second cable portion K2. Together, the transition from the first cable portion K1 to the second cable portion K2 and the guiding device 30 form the catch.

When the second cable portion K2 is wound onto the outer cage 22, the drive means of the inner cage 21 is also operated in such a way that the second cable portion K2, which is between the outer cage 22 and feeding device 50 and to be wound onto the outer cage 22, is always under tension or pretensioned.

When the cable is unwound from the cable receptacle 20, the drive means of the inner cage 21 can be operated in idle mode. However, it is also advantageous to operate the drive means of the inner cage 21 during unwinding in such a way that the respective cable portion between the inner or the outer cage and the feeding device 50 is always under tension or is pretensioned.

The cable reel 10 can have a number of transverse struts 70 that are substantially parallel to axis of rotation DA and arranged in the circumferential direction of the outer cage 22 and spaced apart from one another.

According to a first variant, these transverse struts 70 can be fastened to the outer cage 22, for example in the region of the outer diameter of cage 22, i.e., the transverse struts are fastened to cage 22 at a distance from the outer surface of the hub of the outer cage 22. The transverse struts 70 thus rotate along with the outer cage 22.

According to a second variant, these transverse struts 70 can be fastened to the frame 15. That is, the transverse struts 70 do not rotate along with the outer cage 22.

According to the invention, the second cable portion K2 can be wound in two ways.

According to a first way, the second cable portion K2 is wound on the hub of the outer cage 22. The aforementioned transverse struts 70 can then be dispensed with.

According to a second way and with the provision of the above-mentioned transverse struts 70, the second cable portion K2 can also be wound on the transverse struts 70 and within the transverse struts. This means that the first layer of the wound second cable portion K2 is not wound on the hub of the outer cage 22, but rests against the transverse struts 70. The second layer of the wound second cable portion K2 is then within the first layer of the wound second cable portion K2. As a result, it is possible to prevent the inner layers of the second cable portion K2 from pushing outwardly and sliding past the outer layers due to the high pretension.

FIG. 2 shows a cable reel according to the invention in a sectional view along sectional axis A-A. FIG. 3 shows an enlarged view of the section B marked in FIG. 2. The process of winding is described below with reference to the coupling element 40. However, it also applies analogously to a cable without a coupling element if the first cable portion K1 has a smaller diameter than the second cable portion K2.

The first cable portion K1 is already almost completely wound onto the inner cage 21. The coupling element 40 (the left of the two coupling elements shown in FIG. 3) is located outside the feeding device 50. The coupling element 40 is now supplied to cable receptacle 20 by the feeding device 50 (the left of the two coupling elements shown in FIG. 3). The coupling element 40 is shown twice in FIG. 2, purely for the sake of better understanding the sequence.

The coupling element 40 supplied to cable receptacle 20 (right-hand coupling element) engages in a guide means 30 (see FIG. 3). Here, the guide means has two rollers 31, 32 that extend parallel to axis of rotation DA. The distance between the two rollers is chosen such that it is greater than the diameter of the first cable portion K1 but smaller than the diameter of coupling element 40 and the second cable portion K2.

Instead of rollers 31, 32, it is also possible, for example, for a ring to be provided through which the first cable portion K1 is guided. The ring can be arranged on a rail extending parallel to the axis of rotation in a freely movable manner such that the ring can move back and forth on the rail in synchronism with the feeding device. However, the use of two rollers 31, 32 has proven to be an advantageous solution.

The guide means 30 or the two rollers 31, 32 are arranged in the region of the outer surface of the hub of the outer cage 22 in such a way that, when the second cable portion K2 is wound onto the outer cage 22, they do not protrude and adversely affect the winding process.

As soon as the coupling element 40 engages in the guide means 30, the coupling element 40 and the guide means 30 form a catch together. When the inner cage 21 is rotated (during the winding process), the coupling element 40 cannot be pulled through the guide means 30 due to its larger diameter such that the freely rotating outer cage 22 now also rotates and, consequently, the second cable portion K2 is wound onto the outer cage 22 (either on the hub of the outer cage 22 or on the transverse struts 70).

As soon as the coupling element 40 passes the guide means 30, the travel speed of the feeding device 50 can be adjusted as described above with reference to FIG. 1.

FIG. 4 shows schematic views (in the drawings (a) to (d)) of a cable reel according to the invention to illustrate a winding process.

Drawing (a) shows a first cable portion K1 already largely wound on the inner cage 21. While the first cable portion K1 is being wound, the feeding device 50 is moved along the guide means 51 according to the position of the currently wound portion. In the state shown in drawing (a), the feeding device 50 moves to the left. The travel speed of the feeding device 50 is set or controlled as described above with reference to FIG. 1. When the feeding device 50 reaches the left or right end position, the direction of travel of the feeding device 50 is changed, and the next layer of the supplied second cable portion K2 is wound up.

Drawing (b) shows the state after the complete winding of the first cable portion K1 onto the inner cage 22. The coupling element 40 between the first cable portion K1 and the second cable portion K2 has already passed the feeding device 50 and has already been detected by the feeding device 50. Due to the above-described "carrying along" of the outer cage 22 by the coupling element 40, the outer cage 22 now also rotates, and the second cable portion K2 is wound on the outer cage. When the coupling element 40 is detected, the feeding device 50 is also moved to a start position (in drawing (b) on the far left of the guide means 51), and the winding of the second cable portion K2 is started.

As the outer cage 22 rotates, the feeding device 50 is moved to the right at a predetermined speed (set as described with reference to FIG. 1), and the first layer of the second cable portion K2 is wound onto the outer cage 22. An already partially wound first layer of the second cable portion K2 is shown in drawing (c). As described with reference to FIG. 1, the second cable portion K2 can be wound on the hub of the outer cage 22 or on the transverse struts 70.

Drawing (d) shows the state of the winding process in which the second cable portion K2 is completely wound on the outer cage 22. The portion of the second cable portion K2 that still projects beyond the feeding device 50 is not wound up.

If the second cable portion K2 is so long that one layer is insufficient for winding, the feeding device 50 shown in drawing (d) would change its direction of travel after reaching the right end position, and the second layer of the second cable portion K2 would be wound onto the outer cage from right to left. Depending on whether it is wound from the hub or from the transverse rods 70, the second layer of the second cable portion K2 is radially outside the first layer (when being wound from the hub) or radially within the first layer (when being wound up from the transverse rods 70).

The cable is then unwound in reverse order.

On the second cable portion K2, which is designed as a push rod with a certain stiffness here, an image recording device 60 is arranged that can be placed into a pipe or into a duct with the push rod. Instead of the camera, however, other inspection devices or manipulator devices, such as a gripper, can be arranged.

REFERENCE SIGNS

10 cable reel
15 frame of cable reel 10
20 cable receptacle of cable reel 10
21 inner cage of cable receptacle 20
22 outer cage of cable receptacle 20
30 guide means on the outer cage 22
31, 32 rollers of guide means 30
40 coupling element between the first cable portion K1 and the second cable portion K2
50 feeding device
51 guide means, e.g. guide rail, of feeding device 50
60 camera
70 transverse struts on frame 15 or on the outer cage 22
A-A sectional axis
B section
d1 diameter of the inner cage 21
d2 diameter of the outer cage 22
DA axis of rotation of cable receptacle 20 and the inner and outer cages 21, 22
K cable
K1 first cable portion of cable K
K2 second cable portion of cable K

The invention claimed is:

1. A cable reel (10), in particular for a pipe inspection system, the cable reel having a frame (15) and a cable receptacle (20), the cable receptacle being rotatably arranged on the frame, it being possible to wind a cable (K) onto the cable receptacle and unwind it from the cable receptacle, and the cable receptacle (20) having an inner cage (21) and an outer cage (22), the diameter (d1) of the inner cage being smaller than the diameter (d2) of the outer cage, the inner cage (21) being arranged coaxially with respect to the outer cage (22) and being inside the outer cage, it being possible to rotate the inner cage (21) and the outer cage (22) independently of one another, and the inner cage (21) being provided for receiving a first cable portion (K1) of the cable (K) and the outer cable (22) being provided for receiving a second cable portion (K2) of the cable (K) a guide means (30), through which the first cable portion (K1) can be guided to the inner cage (K2) or vice versa, being provided on the outer cage (22); the guide means (30) having two rollers (31, 32) that are spaced apart from each other and extend parallel to an axis of rotation (DA), the first cable portion (K1) extending between the two rollers.

2. The cable reel of claim 1 further comprising a feeding device (50) being arranged on the frame (15), which feeding device being adapted
    to feed the cable (K) to the cable receptacle (20) in a defined manner for winding, and/or
    to unwind the cable (K) from the cable receptacle (20) in a defined manner.

3. The cable reel of claim 2, the feeding device (50) being arranged radially outside the outer cage (22).

4. The cable reel of claim 2, the feeding device (50) having at least one first drive unit with which the cable (K) is fed in a defined manner and/or unwound in a defined manner.

5. The cable reel of claim 1, the inner cage (21) being coupled to a second drive unit in order to rotate the inner cage about an axis of rotation (DA).

6. The cable reel of claim 1, the outer cage (22) being mounted so as to be freely rotatable about the axis of rotation (DA).

7. The cable reel of claim 1, the guide means (30) being arranged on the outer cage (22) in such a way that the first cable portion (K1) can be guided from radially outside the outer cage (22) to the inner cage (K2) or vice versa.

8. The cable reel of claim 1,
    the diameter of the cable of the first cable portion (K1) being smaller than the diameter of the cable of the second cable portion (K2), and/or
    the first cable portion (K1) being coupled to the second cable portion (K2) via a coupling element (40),
    the distance between the two rollers (31, 32) being chosen such that
    it is greater than the diameter of the cable of the first cable portion (K1) and
    it is smaller than the diameter of the cable of the second cable portion (K2) and/or smaller than the diameter of the coupling element (40).

9. The cable reel of claim 8, the guide means (30) forming a catch means together with the coupling element (40) and/or together with the transition region from the first cable portion (K1) to the second cable portion (K2) such that, during winding of the cable (K), the first cable portion (K1) completely wound on the inner cage (21) carries along the outer cage (22) such that the second cable portion (K2) is wound onto the outer cage (22).

10. A cable reel (10), in particular for a pipe inspection system, the cable reel having a frame (15) and a cable receptacle (20), the cable receptacle being rotatably arranged on the frame, it being possible to wind a cable (K) onto the cable receptacle and unwind it from the cable receptacle, and —the cable receptacle (20) having an inner cage (21) and an outer cage (22), the diameter (d1) of the inner cage being smaller than the diameter (d2) of the outer cage, —the inner cage (21) being arranged coaxially with respect to the outer cage (22) and being inside the outer cage, —it being possible to rotate the inner cage (21) and the outer cage (22) independently of one another, and the inner cage (21) being provided for receiving a first cable portion (K1) of the cable (K) and the outer cable (22) being provided for receiving a second cable portion (K2) of the cable (K); a feeding device (50) arranged on the frame (15), which feeding device being adapted —to feed the cable (K) to the cable receptacle (20) in a defined manner for winding, and/or —to unwind the cable (K) from the cable receptacle (20) in a defined manner; the feeding device (50) being between the outer and inner cages and movable in an alternating reciprocal manner, along a guide means (51), the guide means (51) being at least as long as the width of the cable receptacle (20).

11. The cable reel of claim 10, the guide means (51) comprising a guide rail that preferably extends parallel to the axis of rotation (DA).

12. The cable reel of claim 11, the feeding device (50) having a third drive unit with which the feeding device is moved.

13. The cable reel of claim 11, the travel speed of the feeding device (50) being dependent on the diameter of the cable (K).

14. The cable reel of claim 2, the feeding device (50) being adapted to put tension on or maintain the tension of the cable (K) between the feeding device and the cable receptacle during winding onto the cable receptacle (20).

15. A cable reel (10), in particular for a pipe inspection system, the cable reel having a frame (15) and a cable receptacle (20), the cable receptacle being rotatably arranged on the frame, it being possible to wind a cable (K) onto the cable receptacle and unwind it from the cable receptacle, and the cable receptacle (20) having an inner cage (21) and an outer cage (22), the diameter (d1) of the inner cage being smaller than the diameter (d2) of the outer cage, —the inner cage (21) being arranged coaxially with respect to the outer cage (22) and being inside the outer cage, —it being possible to rotate the inner cage (21) and the outer cage (22) independently of one another, and —the inner cage (21) being provided for receiving a first cable portion (K1) of the cable (K) and the outer cable (22) being provided for receiving a second cable portion (K2) of the cable (K); a feeding device (50) being arranged on the frame (15), which feeding device being adapted —to feed the cable (K) to the cable receptacle (20) in a defined manner for winding, and/or —to unwind the cable (K) from the cable receptacle (20) in a defined manner; said cable reel having a sensor device that is adapted to detect the transition region from the first cable portion (K1) to the second cable portion (K2) and/or a coupling element (40) during the winding and/or during the unwinding of the cable (K), the feeding device (50) being adapted to change the travel speed upon detection of the transition region and/or the coupling element.

16. The cable reel of claim 1, at least one first and second drive units being coordinated with one another such that
   the at least one first drive unit prescribes or defines the winding speed and/or the unwinding speed, and
   the second drive unit ensures that the cable (K) is tensioned between the feeding device (50) and the cable receptacle (20).

17. The cable reel of claim 1, said cable reel having a number of transverse struts (70) that are spaced apart from one another and extend substantially parallel to the axis of rotation (DA), the transverse struts being
   arranged radially outside the outer cage (22) and in the circumferential direction with respect to the outer cage (22) and being attached to the frame (15), or
   arranged in the circumferential direction on the outer cage (22) and attached to the outer cage (22).

* * * * *